(12) United States Patent
Littleton

(10) Patent No.: US 9,861,952 B2
(45) Date of Patent: Jan. 9, 2018

(54) METHOD FOR FILLING A CONFORMAL SHAPED CARBON FILTER

(71) Applicant: Scott Health & Safety Limited, Skelmersdale, Lancashire (GB)

(72) Inventor: Christopher John Littleton, Skelmersdale (GB)

(73) Assignee: Scott Health & Safety LTD, Skelmersdale, Lancashire (GB)

( * ) Notice: Subject to any disclaimer, the term of this patent is extended or adjusted under 35 U.S.C. 154(b) by 80 days.

(21) Appl. No.: 14/711,808

(22) Filed: May 14, 2015

(65) Prior Publication Data

US 2015/0266003 A1    Sep. 24, 2015

Related U.S. Application Data

(63) Continuation of application No. PCT/GB2013/052784, filed on Oct. 25, 2013.

(30) Foreign Application Priority Data

Nov. 15, 2012    (GB) .................................. 1220615.7

(51) Int. Cl.
*B01J 20/20* (2006.01)
*A62B 19/00* (2006.01)
*A62B 23/02* (2006.01)
*B01J 20/30* (2006.01)
*B01D 53/02* (2006.01)
*B01D 53/04* (2006.01)

(52) U.S. Cl.
CPC ............... *B01J 20/20* (2013.01); *A62B 19/00* (2013.01); *A62B 23/02* (2013.01); *B01D 53/02* (2013.01); *B01J 20/3007* (2013.01); *B01J 20/3092* (2013.01); *B01D 53/0415* (2013.01); *B01D 2253/102* (2013.01); *B01D 2259/4541* (2013.01)

(58) Field of Classification Search
CPC .... B01J 20/20; B01J 20/3007; B01J 20/3092; A62B 19/00; A62B 23/02; B01D 53/02
USPC ......................................... 23/314
See application file for complete search history.

(56) References Cited

U.S. PATENT DOCUMENTS

2005/0155665 A1* 7/2005 Schlacchter ........... A62B 23/02
141/12

* cited by examiner

*Primary Examiner* — Edward Johnson
(74) *Attorney, Agent, or Firm* — Christopher & Weisberg, P.A.

(57) ABSTRACT

A method of forming a conformal filter includes a snow-storm filling technique with a reduced sized filling tube and/or the application of ultrasonics.

19 Claims, 7 Drawing Sheets

METHOD FOR FILLING A CONFORMAL SHAPED CARBON FILTER

CROSS-REFERENCE TO RELATED APPLICATIONS

This application is a continuation of International Application No. PCT/GB2013/052784 filed Oct. 25, 2013, and claims the benefit of and priority to GB Application No. 1220615.7 filed Nov. 15, 2012, the contents of both of which are incorporated herein by reference.

BACKGROUND OF THE INVENTION

Respirators typically include a filter canister having a carbon filter that includes activated carbon granules. The carbon granules serve to remove certain gases and vapours, such as organic chemicals, through either physisorption or chemisorption. The carbon granules are formed as a layer between inlet and outlet surfaces of the filter canister. In use, ambient air is inhaled through the inlet surface which then exits the outlet surface as filtered air to be breathed in by the wearer of the respirator.

In filter canisters having a flat filter bed, the filter bed is filled with carbon granules to form a flat carbon layer wherein the depth of the carbon layer is substantially constant in order to obtain optimum filtering performance. A snowstorm filling technique may be used to distribute the carbon granules in the filter bed. In this technique, carbon is fed relatively slowly, at a controlled rate into a filling tube having screens configured such that carbon granules fall evenly into the filter bed when exiting the tube to form a flatbed carbon filter. Snowstorm filling techniques provide a flatbed carbon filter having maximum packing density and minimum volume. Typically, the volume of a flatbed carbon filter formed by this technique is approximately 15-20% lower than a flatbed carbon filter bed not formed by this technique. Snowstorm filling the granules into the filter is a preferred filling methodology for filling conventional filters generally having parallel planar inlet and outlet faces. In snowstorm filling, carbon granules are dropped into a container through a tube containing a number of wire metal screens. The tube has the same face area as the container to be filled. The screen opening size, vertical spacing and other key geometries are related to the particle size of the adsorbent being filled and the geometry of the filter. The screens randomize and uniformly distribute the particles within the container, resulting in a carbon bed that has a minimum volume. This prevents the creation of localized channels within the carbon bed that would provide detrimental uncontrolled flow channels through the adsorption filter. Snowstorm filling is known to provide a maximum density of carbon granules in the filter, which avoid later settling of the adsorbent in the filters. However, snowstorm filling has been limited to use with planar inlet and outlet faces, i.e., filter beds having a uniform flat depth. The use of snowstorm filing for conformal filters has been ineffective because of the mis-distribution of the carbon granules during fill.

Some respirators utilize conformal filter canisters having curved inlet and outlet surfaces to enable the filter canister to closely follow the curvature of a wearer's face. In this configuration, a bottom surface of the filter bed is dome shaped. The use of snowstorm filling techniques to completely fill this type of filter bed is ineffective as its use results in a carbon layer having a flat top surface, but whose depth or thickness is not constant due to the dome shape of the bottom surface. In particular, the thickness of the carbon layer is smallest in an area corresponding to a center of the dome shaped bottom surface and increases in areas further away from the bottom surface. For this reason snowstorm filling is not used for filling conformal filters.

Other approaches for filling a conformal filter canister include filling the canister with carbon granules and then using vibration techniques, e.g., 20 Hz to about 80 Hz, to vibrate the filter canister until a predetermined packing density is reached. However, such approaches result in a carbon layer whose packing density is lower than that achieved by snowstorm filling techniques. This results in a filter that is lower in performance, for the same amount of carbon material, than a respirator having a flatbed filter configuration. The lower density also is susceptible to degradation with exposure to impact forces after manufacture.

SUMMARY OF THE INVENTION

This invention relates to a method for forming a carbon layer used in a filter canister for a respirator, and more particularly, to a method of filling a conformal filter with snowstorm filling preferably with a step of using ultrasonic energy.

A method for forming a conformal filter bed having the steps of defining the internal perimeter of a container inlet to form the filter bed, providing a filling tube having an internal perimeter of a first size and snowstorm filling, at least partially, the filter bed with filter granules, wherein the filter granules are passed through the first filling tube to form a first layer in the filter bed. In a preferred embodiment, a further step includes providing at least a second filling tube having an internal perimeter of a second size, the second size of the filling tube internal perimeter being less than the internal perimeter of the internal perimeter of the container inlet and different than the internal perimeter of the first size tube, and snowstorm filling, at least partially, the filter bed with filter granules, wherein the filter granules are passed through the second filling tube to form a second layer in the filter bed.

The invention relates to manufacture of conformal filter beds, for example, filters used in gas masks. Conformal filter beds resulting from the invention include concave and/or convex profiled filter canisters that are filled with a granular filter material. Optionally ultrasonic energy is then applied into the filled filter cartridges to redistribute the carbon within the constrained volume and effectively seal any weaknesses.

DETAILED DESCRIPTION OF THE PREFERRED EMBODIMENT

Figure 1:
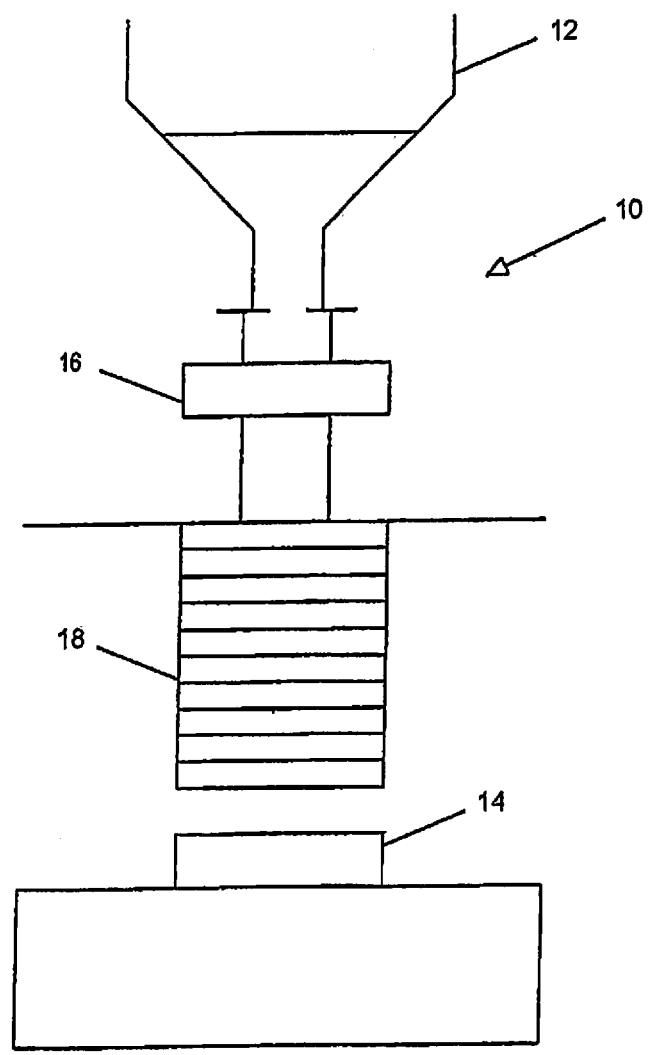
FIG. 1 is a configuration for a snowstorm filling device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In particular, the use of the word "layer" is generally understood to denote the application of carbon, and the application of multiple layers is understood to allow for the contiguous, or uniform, composition of carbon, including the interface between the different applications of carbon layers. In the description below, like reference numerals and labels are used to describe the same, similar or corresponding parts in the several views of FIGS. 1-7.

A method for forming carbon granules into a carbon layer in a filter canister having a convex shaped bottom surface is disclosed. The method includes the step of partially filling the container with carbon granules provided by a filling tube having a first internal perimeter, such as an internal diameter (i.d.), also referred to herein as "size", to form a first carbon layer (or application) having a substantially flat top surface. This first i.d. is preferably equal to the i.d. of the container to create the flat surface. Next, the method includes the step of filling the container with carbon granules provided by a filling tube having a second internal perimeter, e.g., internal diameter (i.d. or size) smaller than the first size to form a second carbon application to augment the amount and shape of the first carbon layer, causes the second carbon application to have a slightly domed top surface. This process may be repeated with various filling tubes until a top surface is achieved that is substantially the same curvature as the convex shaped bottom surface. A contact element is then provided having a concave shape which corresponds to the convex shaped bottom surface. The shape of the internal diameter of the filling tube typically has the same shape as the internal diameter of the inlet of the container being filled, preferably with the first step of a multiple step filling process including the internal diameter of the filling tube and internal diameter of the container inlet having a matching size and shape. Additionally, multiple filling tubes may be used together simultaneously with specified shapes for developing a specific fill. In alternative embodiments the contact element may be convex shaped corresponding to a concave shaped bottom surface, or a mixture of such shapes or intermittent flat surfaces provided that there is an equal depth across the surface of the carbon fill. The first and second carbon applications are then compressed by the contact element to form the first and second carbon applications, and optionally additional applications, into a resulting carbon layer having a top surface which corresponds to the convex shaped bottom. The contact element may also be energized with ultrasonic energy to form the first and second carbon layers into the resulting carbon layer. If the iterative process to create the approximate convex shape yields a sufficiently close approximation to the correct curvature, then the ultrasonic step is not required. Similarly, it is possible to achieve the approximate correct shape of the snowstorm parameters such that only one snowstorm step is required, e.g., the first i.d. may be smaller than the i.d. of the container, and as such, creates a domed shaped top surface, which in particular applications allows a single step fill of the container. Preferably the method that includes multiple sequential filling steps is performed with movement of the filling tubes, with the filter bed remaining stationary, so that the filter bed is not disturbed during manufacture.

Referring to FIG. 1, a configuration for a snowstorm filling device 10 is shown. The device 10 includes a supply bin 12 for supplying activated carbon granules which are collected in a container 14 used in a filter canister for a respirator. The carbon granules serve as adsorption media for removing certain types of gases and vapours, such as organic chemicals, from air inhaled by a wearer of the respirator. The device 10 further includes control apparatus 16 for controlling the flowrate and direction of carbon granules through a filling tube 18 having an internal opening and internal screens (not shown). The length of the filling tube 18, along with the size of the internal opening and screens, are related to the size of the carbon granules and/or the size and shape of the container 14. The internal opening and internal screens of the filling tube 18 are configured such that carbon granules are randomized and are uniformly distributed across the surface of a container being filled.

Figure 2:
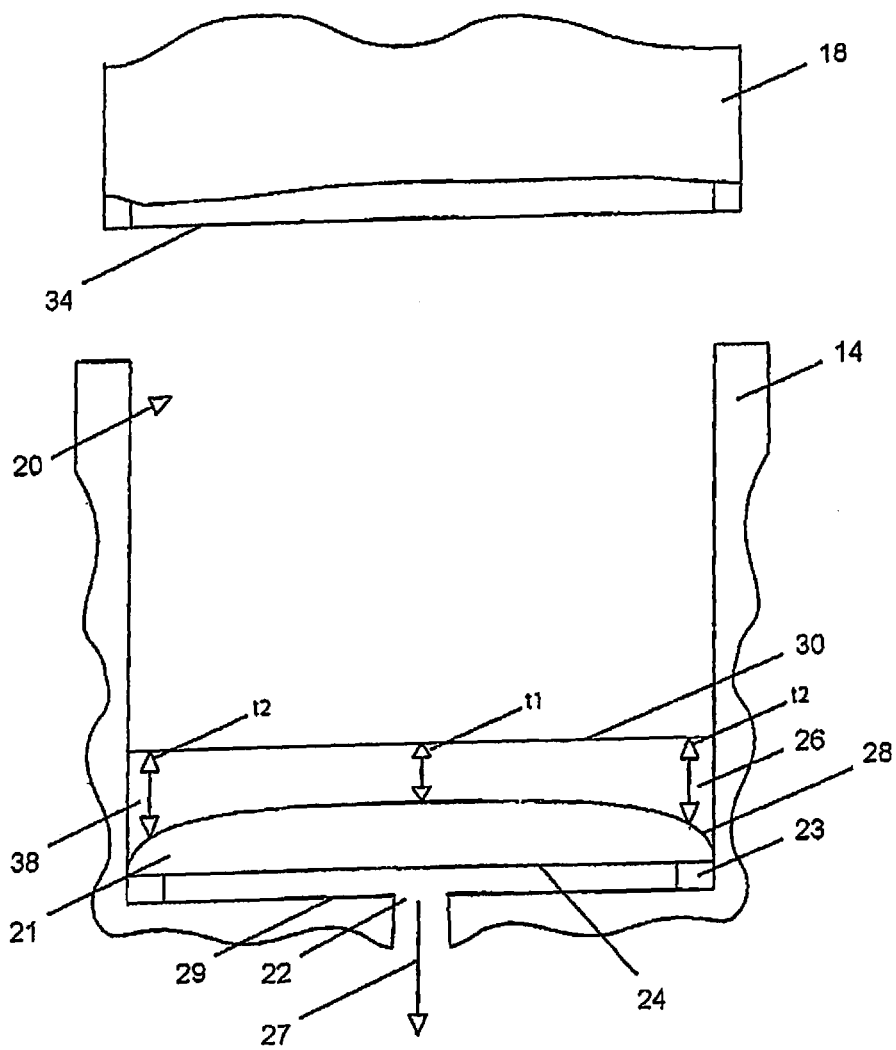
FIG. 2 depicts a container for a filter canister which includes a lower aperture grille positioned on a bottom surface of the container.

Referring to FIG. 2, a method for filling the container 14 in accordance with the invention will now be described. The container 14 includes a container opening 20 for receiving a bottom grille 21 having a dome or convex shaped upper surface 28 and carbon granules 26. The container 14 further includes a plenum 22 formed in a bottom surface 29 of the container 14 and an annular spacer 23 positioned on the bottom surface 29. In one embodiment, the container opening 20 is approximately 100 mm wide. The bottom grille 21 is placed on the spacer 23. Lower surface 24 of the bottom grille 21 is shown in a flat configuration for purposes of clarity and it is understood that this surface is curved when used in a respirator. The plenum 22 enables air (indicated by arrow 27) to flow through the filter for subsequent testing purposes.

In a first step, the container is partially filled through opening 20 using a snowstorm technique wherein the filling tube 18 has a first internal opening 34 (shown as a cutaway view) whose size corresponds to the size of the container opening 20. This results in the formation of a first carbon layer 38 having a first top surface 30 which may be substantially flat and whose thickness varies due to the convex shape of the upper surface 28 of the bottom grille 21. In particular, the thickness t1 of the first carbon layer 38 is smallest in an area corresponding to a center of the upper surface 28 whereas the thickness increases in areas further away from the center of the upper surface 28 as shown by t2 in FIG. 2.

Figure 3:
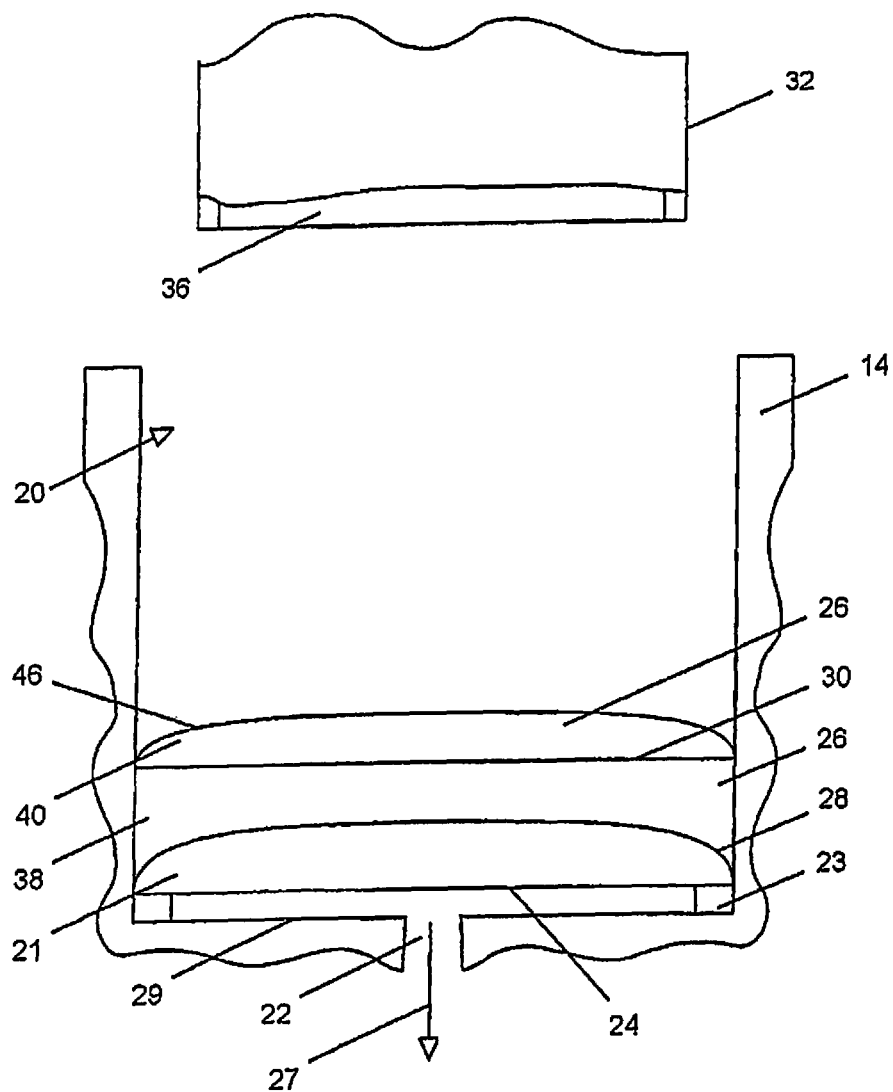
FIG. 3 depicts a filling tube of the invention for use with the snowstorm filling device.
Figure 4:
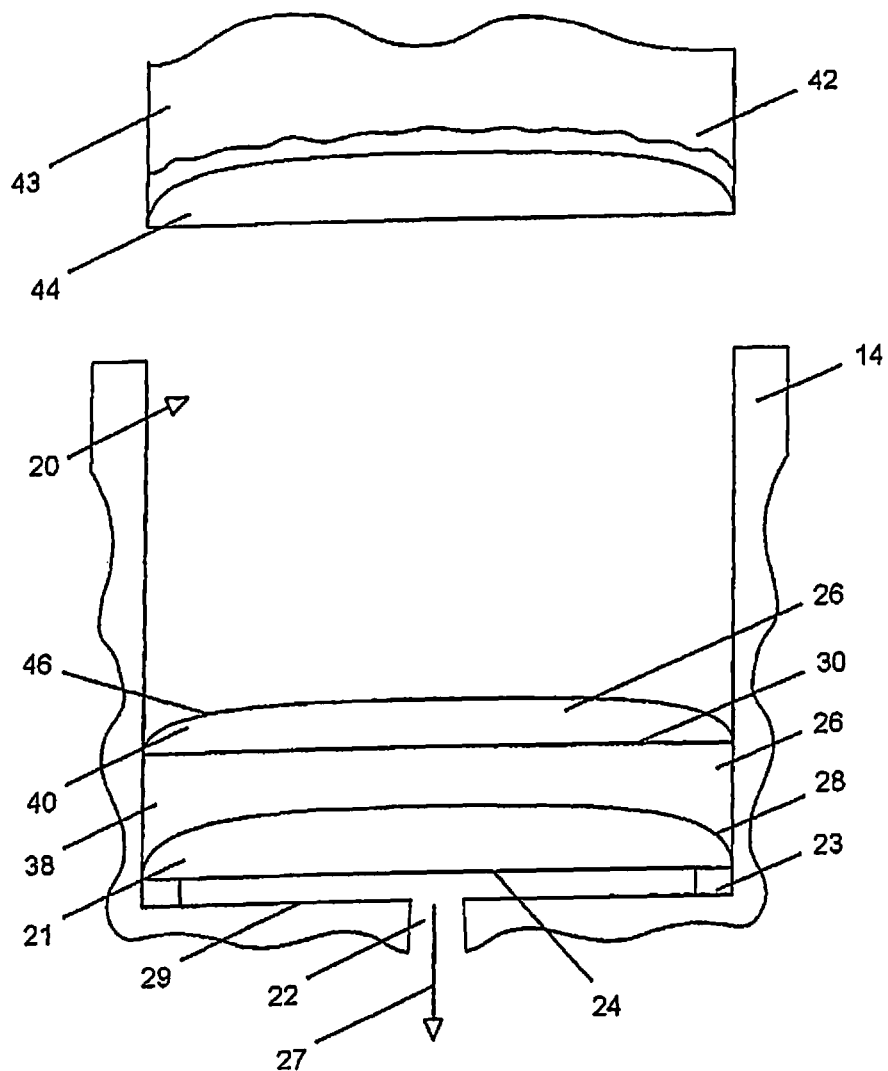
FIG. 4 depicts a sonotrode of an ultrasonic system having a concave shaped contact portion.

Referring to FIG. 3, a second filling tube 32 is then used to deposit additional carbon granules 26. The second filling tube 32 has a second internal opening 36 which is reduced in size relative to the container opening 20. In one embodiment, the second internal opening 36 of the second filling tube 32 is approximately 50% of the size of the container opening 20. Other sizes may also be used, such as sizes in the range of approximately 60%-95%, 25%-80%, 30%-90%, and other such sizes of the size of the container opening 20.

Additionally various shapes may be used for the second filling tube 32. In accordance with the invention, additional carbon granules 26 are deposited on the first top surface 30 using the second filling tube 32, resulting in a buildup of carbon granules 26 to form a second carbon layer 40 on top of the first top surface 30. This introduces a second carbon layer 40 having a dome shaped second top surface 46. In accordance with the invention, the second filling tube 32 is sized such that the curvature of the resulting second 46 top surface acceptably approximates the curvature of the upper surface 28 of bottom grille 21.

In an alternate embodiment, the process of forming carbon layers is repeated as desired with different sized and or shaped filling tubes 32 to form carbon layers in a stacked configuration. Altering the size and shape of the aperture 36, the quantity of carbon at each stage and the height of the drop at each stage also allows an acceptable approximation of the desired curvature of the upper surface 28 to the lower grille 21. In one embodiment, a method in accordance with the invention includes a first step wherein approximately 28 grams of carbon granules 26 are deposited into the container 14 using a filling tube 32 that has a 100% size opening to form a first carbon layer. In a next step, approximately 2 grams of carbon granules 26 are deposited onto the first carbon layer using a filling tube 32 that has an approximate 50% size opening to thus form a second carbon layer. In a still further step, approximately 10 grams of carbon granules are deposited onto the third carbon layer using a filling tube 32 that has an approximate 80% size opening. It is understood that other quantities of carbon and filling tube sizes and shapes, along with additional or fewer steps, may be used in order to provide an acceptable conformal shape.

Figure 5:
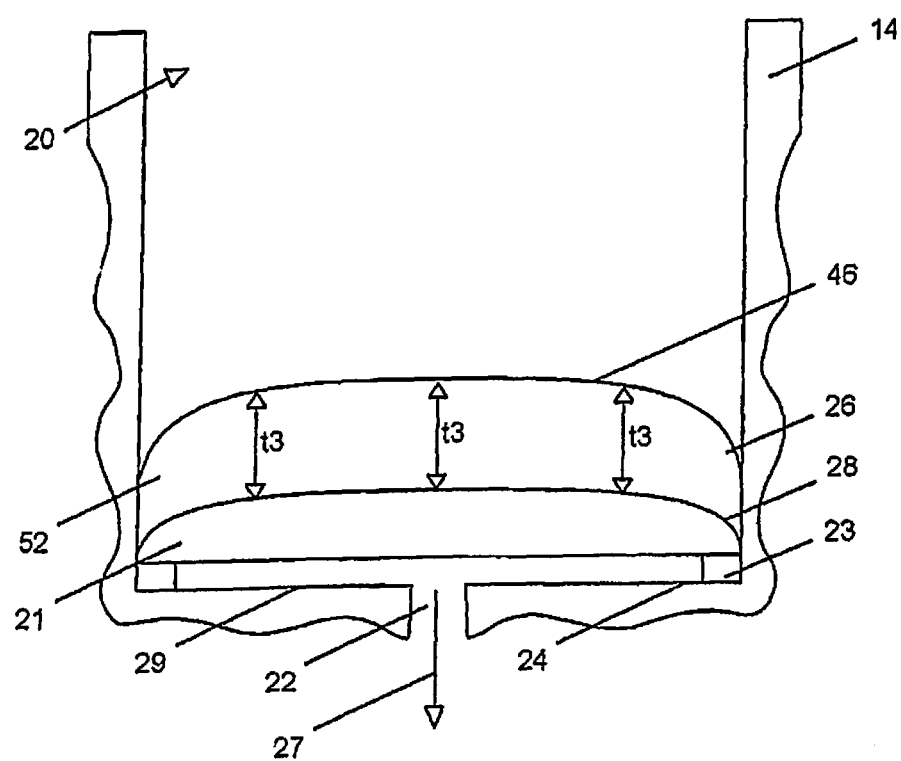
FIG. 5 depicts a carbon layer top surface having a convex shape that approximates the convex shape of the lower grille surface.

In a next step, the first 38 and second 40 carbon layers are compressed such that the shape of the second 46 top surface corresponds to the convex shape of the upper surface 28. In one embodiment, a simple press 43 may be used (see FIG. 4) to compress the first 38 and second 40 carbon layers. The press 43 includes a contact portion 44 (shown in a cutaway view) having a concave shape that corresponds to the convex shape of the upper surface 28. The press 43 is then lowered and positioned in contact with the second 40 carbon layers to compress the carbon granules 26 of the first 38 and second 40 carbon layers such that the shape of the second 40 top surfaces conforms to the concave shape of the contact portion 44. This forms a carbon layer top surface 46 having a convex shape as can be seen in FIG. 5 and causing a uniform composition of the granular bed. As a result, the convex shape of the top surface 46 corresponds to the convex shape of the upper surface 28. In addition, a resulting carbon layer 52 is formed having a substantially constant thickness t3 in areas corresponding to a center of the upper surface 28 and in areas further away from the center of the upper surface 28.

Alternatively, or in addition to the step of compressing the first 38 and second 40 carbon layers, an ultrasonic system having a sonotrode may be used to shape the first 38 and second 40 carbon layers. Ultrasonics may be used, for example, if the shape of the top surface 46 is not within approximately 1 millimeter of the shape of the upper surface 28. Referring back to FIG. 4, an ultrasonic system, such as a sonotrode 42 is configured to include the previously described contact portion 44. The sonotrode 42 is then lowered and positioned in contact, e.g., with the first 38 and second 40 carbon layers and the ultrasonic system is activated. Ultrasonic energy from the sonotrode 42 then compresses the carbon granules 26 of the first 38 and second 40 layers such that the shape of the top surface 46 conforms to the concave shape of the contact portion 44 of the sonotrode 42. This forms the resulting top surface 46 and the resulting carbon layer 52 as previously described. In a preferred embodiment, the ultrasonic system is activated, such as up to about 2 seconds, preferably up to 1 second, more preferably from about 0.1 seconds to about 1 second, and most preferably about 0.5 seconds with an appropriate amplitude, preferably from about 10 micron to about 160 microns, more preferably from about 30 microns to about 100 microns, and most preferably from about 40 microns to about 80 microns, and an appropriate frequency, preferably from about 15 kHz to about 100 kHz, more preferably from about 15 kHz to about 35 kHz, and most preferably about 20 kHz. Variations of the time and energy are determinable with experimentation by those skilled in the art.

Figure 6:
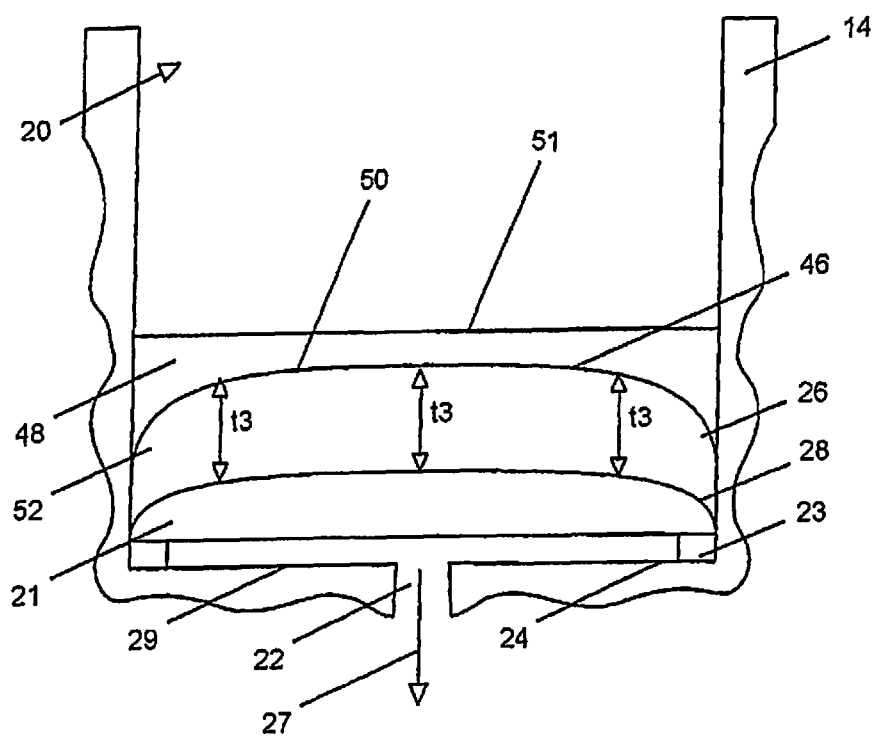
FIG. 6 depicts an upper aperture grille positioned in the container opening and positioned on the carbon layer top surface; and, FIG. 7 depicts an alternate embodiment wherein a container having a concave shaped bottom surface is filled with carbon granules.

Referring to FIG. 6, top grille 48 having a lower surface 50 is shown positioned on top of the resulting carbon layer 52. In particular, the lower surface 50 has a concave shape which corresponds to the convex shape of the top surface 46. In FIG. 6, an upper surface 51 of the top grille 48 is shown in a flat configuration for purposes of clarity and it is understood this surface is also curved when used in a respirator. In accordance with the invention, the packing density achieved for the resulting carbon layer 52 when formed in accordance with the methods of the current invention is approximately equivalent to the packing density of a flatbed carbon filter bed produced by conventional snowstorm techniques. This results in a carbon filter having a reduced volume which is approximately equal to the volume of a flatbed carbon filter completely formed by a snowstorm filling technique. Further, the performance of a carbon filter formed in accordance with the invention when used in a respirator is approximately equal to the performance of a flatbed carbon filter completely formed by a snowstorm filling technique.

Figure 7:
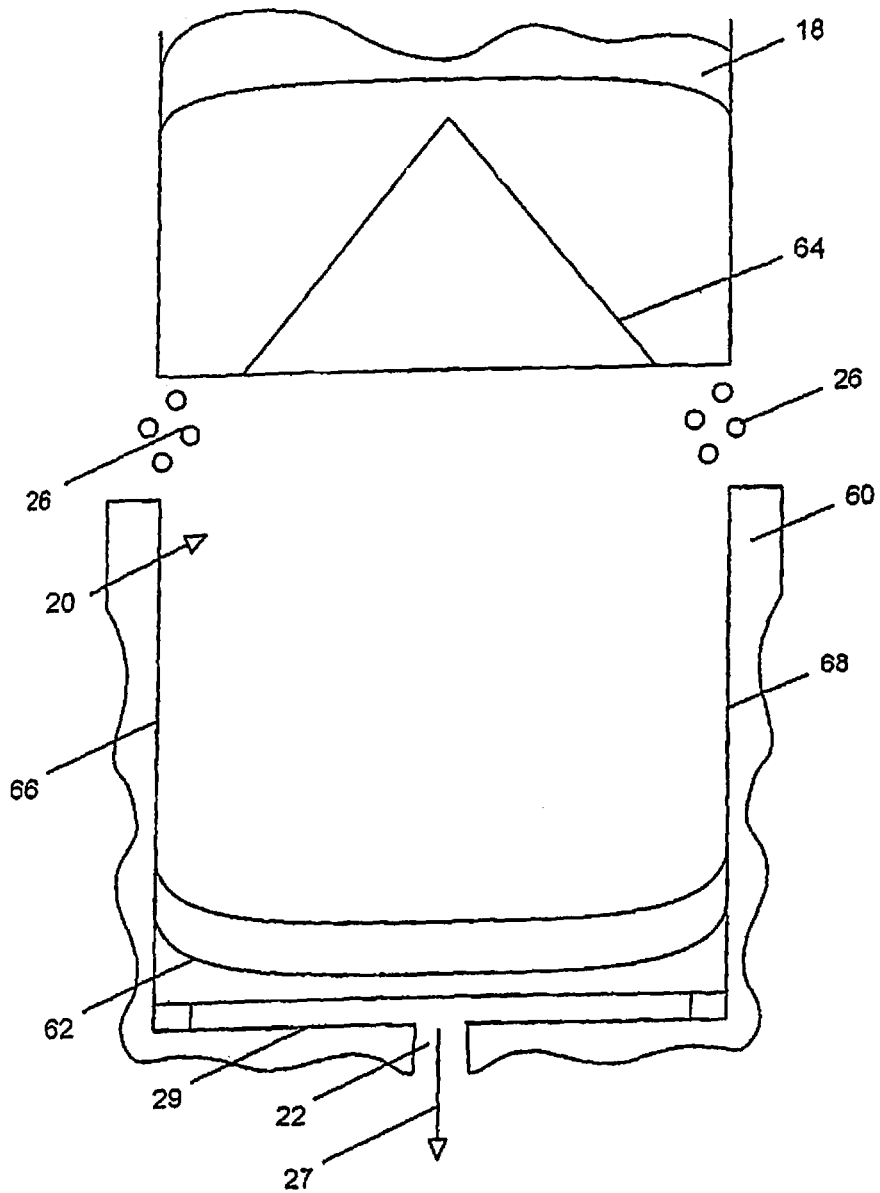

Referring to FIG. 7, the invention is also applicable to a container 60 which has a concave, rather than convex, shaped bottom surface 62. In this embodiment, the container 60 is filled in a substantially reverse process to that used to fill the container 14 having a convex upper surface 28 as previously described. In particular, a spreader plate 64 is placed inside the filling tube 18 in order to push or channel the carbon granules 26 exiting the filling tube 18 away from a center of the container 60 and toward walls 66, 68 of the container 60 to ultimately form a concave shaped carbon layer. The size and shape of the spreader plate 64 may be varied in order to form successive stacked carbon layers. Further, the size of the filling tube 18 remains constant and is approximately the size of the container opening 20. An exemplary process for filling the container 60 will now be described. In a first step, a base layer of carbon is formed which ultimately forms a first carbon layer having a substantially flat top surface. In a second step, a spreader plate 64 is sized smaller than the container opening 20. By way of example, the first spreader plate 64 may be sized approximately 50% smaller than the container opening 20. Carbon granules 26 are introduced into the filling tube 18 which are then channeled outward by the spreader plate 64 and are deposited in the container 60. A larger spreader plate 64 is then placed in the filling tube 18 which replaces the smaller spreader plate. For example, a size of the larger spreader plate 64 is smaller than the size of the container opening 20, e.g., approximately 80% the size. The remainder of the container 60 is then filled with carbon granules 26 introduced into the filling tube 18 which are channeled outward by the spreader plate 64 and are deposited in the container 60 near the walls 66,68. A contact element having a convex shape which corresponds to the concave shaped bottom surface is then used to compress the first, and subsequent carbon layers to form a resulting carbon bed having a top surface that corresponds to the concave shape. This results in a carbon layer having a substantially constant thickness. Alternatively, or in addition to the step of compressing the first and second carbon layers, an ultrasonic system having a sonotrode may be used to ultrasonically energize the contact element. Additional configurations incorporating both concave and convex bottom portions may be formed.

The resulting carbon layer is used in a filter canister for a respirator. Preferably the performance of the resulting carbon layer is approximately equal to the performance of a flat carbon layer completely formed by a snowstorm filling technique.

Experiments 1

Conventional Methodology (1) 33 g of carbon was passed through a 100% snowstorm filler (a snowstorm filler with a size that is the same size as the container being filled) into a round container with flat grilles to produce a conventional filter. The gas life of the filter was 20 minutes under standard conditions.

(2) 45 g of carbon was passed through a 100% snowstorm filler into a round container with a conformal bottom grille and a flat top grille was placed on top. The gas life of the filter was 5 minutes under standard conditions.

(3) 33 g of carbon was passed through a 100% snowstorm filler into a round container with flat grilles to produce a conventional filter. The gas life of the filter was 19 minutes under standard conditions.

(4) 33 g of carbon was passed through a 100% snowstorm filler into a round container with flat grilles to produce a conventional filter. The gas life of the filter was 19 minutes under standard conditions.

Experiments 2

Inventive Experimentation (1) 33 g of carbon was passed through a 100% snowstorm filler into a round container with a conformal bottom grille; this produced a flat top surface. A sonotrode with a shape matched to the bottom grille mounted in a ultrasonic machine was brought into contact with the top surface. The ultrasonics were fired for 0.5 seconds at approximately 20 kHz and with an amplitude of approximately 60 µm imparting 150 J of energy and moving the sonotrode 1.1 mm during the active cycle. The gas life of the filter was 17 minutes under standard conditions.

(2) 20 g of carbon was passed through a 100% snowstorm filler into a round container with a conformal bottom grille; this produced a flat top surface. A further 13 g of carbon was passed through a 80% snowstorm filler (a snowstorm filler with a size that is 80% the size of the container being filled) to produce a conformal top surface that was close to the shape of the bottom grille. A sonotrode with a shape matched to the bottom grille mounted in an ultrasonic machine was brought into contact with the top surface. The ultrasonics were fired for 0.5 seconds at approximately 20 kHz and with an amplitude of approximately 60 µm imparting 150 J of energy and moving the sonotrode 0.3 mm during the active cycle. The gas life of the filter was 19 minutes under standard conditions.

(3) 20 g of carbon was passed through a 100% snowstorm filler into a round container with a conformal bottom grille; this produced a flat top surface. A further 13 g of carbon was passed through an 80% snowstorm filler (a snowstorm filler with a size that is 80% the size of the container being filled) to produce a conformal top surface that was close to the shape of the bottom grille. A sonotrode with a shape matched to the bottom grille mounted in an ultrasonic machine was brought into contact with the top surface. The ultrasonics were not fired but the sonotrode moved 0.15 mm during the cycle. The gas life of the filter was 19 minutes under standard conditions.

(4) 23 g of carbon was passed through a 100% snowstorm filler into a round container with a conformal bottom grille; this produced a flat top surface. A further 2 g of carbon was passed through a 50% snowstorm filler (a snowstorm filler with a size that is 50% the size of the container being filled) which produced a flat top surface with a small central raised section. A further 8 g of carbon was passed through an 80% snowstorm filler (a snowstorm filler with a size that is 80% the size of the container being filled) to produce a conformal top surface that was close to the shape of the bottom grille. A sonotrode with a shape matched to the bottom grille mounted in an ultrasonic machine was brought into contact with the top surface. The ultrasonics were fired for 0.5 seconds at approximately 20 kHz and with an amplitude of approximately 60 µm imparting approximately 150 J of energy and moving the sonotrode approximately 0.6 mm during the active cycle. The gas life of the filter was 19 minutes under standard conditions.

(5) 23 g of carbon was passed through a 100% snowstorm filler into a round container with a conformal bottom grille; this produced a flat top surface. A further 2 g of carbon was passed through a 50% snowstorm filler (a snowstorm filler with a size that is 50% the size of the container being filled) which produced a flat top surface with a small central raised section. A further 8 g of carbon was passed through an 80% snowstorm filler to produce a conformal top surface that was close to the shape of the bottom grille. A sonotrode with a shape matched to the bottom grille mounted in an ultrasonic machine was brought into contact with the top surface. The ultrasonics were not fired but the sonotrode moved 0.15 mm during the cycle. The gas life of the filter was 19.5 minutes under standard conditions.

(6) 20 g of carbon was passed through a 100% snowstorm filler into a round container with a conformal bottom grille; this produced a flat top surface. A further 10 g of carbon was passed through an 80% snowstorm filler (a snowstorm filler with a size that is 80% the size of the container being filled) which produced a conformal top surface. A further 3 g of carbon was passed through a 50% snowstorm filler (a snowstorm filler with a size that is 50% the size of the container being filled) to produce a conformal top surface that was close to the shape of the bottom grille. A sonotrode with a shape matched to the bottom grille mounted in an ultrasonic machine was brought into contact with the top surface. The ultrasonics were fired for 0.5 seconds at approximately 20 kHz and with an amplitude of approximately 60 µm imparting 150 J of energy and moving the sonotrode approximately 0.6 mm during the active cycle. The gas life of the filter was 19.5 minutes under standard conditions.

Experiment 3

Prophetic Examples (1) 33 g of carbon is passed through a 92.5% snowstorm filler (a snowstorm filler with a size that is 92.5% of the container being filled) into a round container with a conformal bottom grille to produce a conformal top surface. A sonotrode with a shape matched to the bottom grille is brought into contact with the top surface. The ultrasonics is fired for 0.5 seconds at approximately 20 kHz with an amplitude of approximately 60 μm.

(2) 33 g of carbon is passed through a 82.5% snowstorm filler (a snowstorm filler with a size that is 82.5% the size of the container being filled) into an oval container with a conformal bottom grille to produce a conformal top surface. A sonotrode with a shape matched to the bottom grille is brought into contact with the top surface. The ultrasonics is fired for 1 second at approximately 15 kHz with an amplitude of approximately 30 μm.

(3) 33 g of carbon is passed through a 75% snowstorm filler (a snowstorm filler with a size that is 75% the size of the container being filled) into a round container with a conformal bottom grille to produce a conformal top surface. A sonotrode with a shape matched to the bottom grille is brought into contact with the top surface. The ultrasonics is fired for 0.2 seconds at approximately 50 kHz with an amplitude of approximately 120 μm.

(4) 33 g of carbon is passed through a 92.5% snowstorm filler (a snowstorm filler with a size that is 92.5% the size of the container being filled) into an ovoid container with a conformal bottom grille to produce a conformal top surface. A sonotrode with a shape matched to the bottom grille is brought into contact with the top surface. The ultrasonics is fired for 2 seconds at approximately 60 kHz with an amplitude of approximately 60 μm.

(5) 33 g of carbon is passed through a 20 mm diameter snowstorm filler into a round container with a conformal bottom grille. The tube is moved in a pattern such that more carbon impacts at the centre of the filter than the outer edges, to produce a conformal top surface. A sonotrode with a shape matched to the bottom grille is brought into contact with the top surface. The ultrasonics is fired for 0.5 seconds at approximately 120 kHz with an amplitude of approximately 60 μm.

(6) 30 g of carbon is passed through a 92.5% snowstorm filler (a snowstorm filler with a size that is 92.5% the size of the container being filled) into a round container with a conformal bottom grille to produce a conformal top surface. A further 3 g of carbon is passed through a 30% snowstorm filler (a snowstorm filler with a size that is 30% the size of the container being filled) to produce a conformal top surface. A sonotrode with a shape matched to the bottom grille is brought into contact with the top surface. The ultrasonics is fired for 0.1 seconds at approximately 50 kHz with an amplitude of approximately 30 μm.

(7) 625 g of carbon is passed through a 95% snowstorm filler (a snowstorm filler with a size that is 95% the size of the container being filled) into an ovoid container with a conformal bottom grille to produce a conformal top surface. A further 28 g of carbon is passed through a 64% snowstorm filler (a snowstorm filler with a size that is 64% the size of the container being filled) to produce a conformal top surface. A sonotrode with a shape matched to the bottom grille is brought into contact with the top surface. The ultrasonics is fired for 1.5 seconds at approximately 30 kHz with an amplitude of approximately 90 μm.

(8) 25 g of carbon is passed through a 100% snowstorm filler (a snowstorm filler with a size that is 100% the size of the container being filled) into a round container with a concave bottom grille to produce a flat top surface. A further 28 g of carbon is passed through a 100% snowstorm filler (a snowstorm filler with a size that is 100% the size of the container being filled), but with a 60% spreader cone present produce a concave top surface. A sonotrode with a shape matched to the bottom grille is brought into contact with the top surface. The ultrasonics is fired for 0.5 seconds at approximately 20 kHz with an amplitude of approximately 60 μm.

Although the invention is described in relation to carbon granules, the invention is also applicable with respect to any granular adsorbate for filtration or with any granular material where compaction is required. Further, while the invention has been described in conjunction with specific embodiments, it is evident that many alternatives, modifications, permutations and variations will become apparent to those skilled in the art in light of the foregoing description. Accordingly, it is intended that the invention embrace all such alternatives, modifications and variations.

The invention claimed is:

1. A method for forming a conformal filter bed, comprising the steps of:
    defining the internal perimeter of a container inlet to form the filter bed; providing a filling tube having an internal perimeter of a first size, the first size of the filling tube internal perimeter being less than the internal perimeter of the filter bed; and,
    snowstorm filling, at least partially, the filter bed with filter granules, wherein the filter granules are passed through the first filling tube to form a layer in the filter bed.

2. The method of claim 1, further comprising the step of compressing the snowstorm filled filter bed with a contact element having a predetermined shape wherein the carbon bed is formed into a resulting bed having a top surface which corresponds to a predetermined conformal shape.

3. The method of claim 2, wherein the contact element is an ultrasonic sonotrode.

4. The method of claim 1, wherein the container is defined by a filter canister.

5. A method for forming a conformal filter bed, comprising the steps of:
    defining the internal perimeter of a container inlet to form the filter bed;
    providing a filling tube having an internal perimeter of a first size; and,
    snowstorm filling, at least partially, the filter bed with filter granules, wherein the filter granules are passed through the first filling tube to form a first layer in the filter bed;
    providing at least a second filling tube having an internal perimeter of a second size, the second size of the filling tube internal perimeter being less than the internal perimeter of the internal perimeter of the container inlet and different than the internal perimeter of the first size tube; and,
    snowstorm filling, at least partially, the filter bed with filter granules, wherein the filter granules are passed through the second filling tube to form a second layer in the filter bed.

6. The method of claim 5, wherein the internal perimeter of the first size of the filling tube is equal to the internal perimeter of the container inlet.

7. The method of claim 5, further comprising the step of compressing the snowstorm filled carbon bed with a contact element having a predetermined shape wherein the filter bed is formed into a resulting layer having a top surface which corresponds to the predetermined shape.

8. The method of claim 7, wherein the contact element is an ultrasonic sonotrode.

9. A method of claim 8, wherein the sonotrode is excited with an ultrasonic energy having a amplitude of from about 1 micron to about 120 microns.

10. The method of claim 8, wherein the sonotrode has an ultrasonic energy frequency of from about 15 kHz to about 100 kHz.

11. The method of claim 5, wherein the internal diameter of the first filling tube is less than of the internal perimeter of the container inlet.

12. The method of claim 5, further comprising providing at least a third filling tube having an internal perimeter of a third size, the third size of the filling tube internal perimeter being less than the internal perimeter of the internal perimeter of the container inlet and different than the internal perimeter of the second size tube; and,
    snowstorm filling, at least partially, the filter bed with filter granules, wherein the filter granules are passed through the third filling tube to form a third layer in the filter bed.

13. A method of claim 12, wherein the step of filling the container is repeated by using at least a fourth filling tube having a different size than the filling tube of the previous step.

14. The method of claim 5, wherein the formed filter bed has a convex shape.

15. The method of claim 5, wherein the formed filter bed has a concave shape.

16. The method of claim 5, wherein the steps of filling the container include the first filling tube with a substantially equal perimeter of the container inlet, the second filling tube with a perimeter about 50% the size of the container inlet and a third filling tube with a perimeter of about 80% the size of the container inlet.

17. A method for forming a filter bed, comprising the steps of snowstorm filling a filter bed container and applying an ultrasonic thereto.

18. A method of claim 17, wherein the ultrasonic is from about 0.1 seconds to about 2 seconds, with an amplitude of from about 10 micron to about 160 microns and a frequency of from about 15 kHz to about 100 kHz.

19. A method for forming a conformal filter bed, comprising the steps of:
    defining the opening of a container inlet to form the filter bed;
    providing a filling tube having an opening, the opening of the filling tube being smaller than the opening of the container inlet; and,
    snowstorm filling, at least partially, the filter bed with filter granules, wherein the filter granules are passed through the filling tube opening to form a layer in the filter bed.

* * * * *